United States Patent
Thompson

(10) Patent No.: US 9,709,822 B2
(45) Date of Patent: Jul. 18, 2017

(54) ORTHOKERATOLOGY LENS WITH DISPLACED SHAPING ZONE

(71) Applicant: Vance M. Thompson, Sioux Falls, SD (US)

(72) Inventor: Vance M. Thompson, Sioux Falls, SD (US)

( * ) Notice: Subject to any disclaimer, the term of this patent is extended or adjusted under 35 U.S.C. 154(b) by 46 days.

(21) Appl. No.: 14/644,860

(22) Filed: Mar. 11, 2015

(65) Prior Publication Data
US 2016/0266404 A1    Sep. 15, 2016

(51) Int. Cl.
G02C 7/04    (2006.01)
G02C 7/02    (2006.01)
G02C 7/00    (2006.01)

(52) U.S. Cl.
CPC .......... *G02C 7/047* (2013.01); *G02C 7/00* (2013.01); *G02C 7/021* (2013.01); *G02C 7/04* (2013.01); *G02C 7/048* (2013.01)

(58) Field of Classification Search
CPC ........ G02C 7/047; G02C 7/048; G02C 7/021; G02C 7/00; G02C 7/04
USPC .......................... 351/159.23, 159.01, 159.02
See application file for complete search history.

(56) References Cited

U.S. PATENT DOCUMENTS

| | | | |
|---|---|---|---|
| 5,191,365 A * | 3/1993 | Stoyan | G02C 7/047 351/159.1 |
| 5,422,687 A | 6/1995 | Tanaka et al. | |
| 5,880,809 A * | 3/1999 | Lieberman | G02C 7/047 351/159.02 |
| 5,963,297 A * | 10/1999 | Reim | G02C 7/047 351/159.23 |
| 6,241,355 B1 * | 6/2001 | Barsky | G02C 7/021 351/159.74 |
| 6,361,169 B1 * | 3/2002 | Tung | G02C 7/047 351/219 |
| 6,543,897 B1 * | 4/2003 | Tung | G02C 7/047 351/159.23 |
| 6,582,077 B1 * | 6/2003 | Tabb | G02C 7/047 351/159.74 |
| 6,896,368 B2 | 5/2005 | Baugh | |
| 8,192,020 B2 | 6/2012 | Goto et al. | |
| 2002/0003605 A1 | 1/2002 | Rogers et al. | |

(Continued)

FOREIGN PATENT DOCUMENTS

| | | |
|---|---|---|
| JP | 2007-195818 A | 8/2007 |
| WO | WO 97/34185 | 9/1997 |

OTHER PUBLICATIONS

PCT International Search Report for International Application No. PCT/US2016/017805, dated May 11, 2016.

*Primary Examiner* — William R Alexander
(74) *Attorney, Agent, or Firm* — Patterson Thuente Pedersen, P.A.

(57) ABSTRACT

A contact lens for application in practice of orthokeratology on an eye, including a curved shell having a concave surface and a convex surface. The concave surface includes a carrier zone and a back shaping zone, the back shaping zone having a first curvature and the carrier zone having at least one second curvature. The curved shell has a geometric center and the back shaping zone has a shaping zone center and the back shaping zone center is offset peripherally from the geometric center. The curved shell can have an overall diameter that approximates a corneal limbal diameter of the eye to which the contact lens is to be applied.

23 Claims, 7 Drawing Sheets

(56) References Cited

U.S. PATENT DOCUMENTS

| | | | |
|---|---|---|---|
| 2002/0159025 A1* | 10/2002 | Legerton | G02C 7/047 351/159.1 |
| 2008/0212021 A1* | 9/2008 | Berke | G02C 7/047 351/159.02 |
| 2009/0141235 A1* | 6/2009 | Collins | G02C 7/04 351/159.79 |
| 2009/0303442 A1* | 12/2009 | Choo | G02C 7/047 351/246 |
| 2010/0069857 A1* | 3/2010 | Christensen | A61F 2/14 604/300 |
| 2010/0171924 A1* | 7/2010 | Perrin | G02C 7/048 351/159.06 |
| 2010/0296050 A1* | 11/2010 | Goto | G02C 7/021 351/159.06 |
| 2011/0285958 A1 | 11/2011 | Berke | |
| 2012/0105804 A1 | 5/2012 | Legerton | |
| 2012/0188502 A1 | 7/2012 | Abderhalden | |
| 2012/0242952 A1* | 9/2012 | Nakajima | G02C 7/048 351/159.38 |
| 2013/0182216 A1* | 7/2013 | Ho | G02C 7/02 351/159.14 |
| 2014/0043588 A1* | 2/2014 | Grant | G02C 7/047 351/247 |

\* cited by examiner

ORTHOKERATOLOGY LENS WITH DISPLACED SHAPING ZONE

FIELD OF THE INVENTION

The invention generally relates to the field of contact lenses. More particularly, the invention relates to contact lenses that are applied to the eye in the practice of orthokeratology to temporarily reshape the anterior corneal surface.

BACKGROUND OF THE INVENTION

Orthokeratology is the practice of applying rigid generally highly oxygen permeable contact lenses to the eye to reshape the anterior corneal surface, thus altering refractive error temporarily or possibly permanently. Orthokeratology is sometimes identified by other names such as corneal shaping contact lenses, overnight vision correction, overnight contact lenses to correct or control myopia, or corneal refractive therapy. Other identifiers beyond these may be utilized as well. Orthokeratology is used primarily in the treatment of myopia or myopia with astigmatism. However, orthokeratology has also been utilized, less commonly, in the refractive treatment of hyperopia or hyperopia with astigmatism.

Orthokeratology has existed in some form for many decades. Early, hard contact lenses were noted by many to temporarily alter the anterior corneal shape, thus, creating alterations in refractive error when the contact lenses were not on the eye. Early attempts to practice orthokeratology utilizing hard (PMMA or polymethyl methacrylate) contact lenses were hindered by poor technology and limited understanding of corneal physiology and the criteria necessary to predictably correct for myopia by corneal molding. Significant advances have been made in the practice of orthokeratology since the advent of corneal topography measuring instrumentation in approximately the last twenty years. The advent of computerized corneal topography has permitted the creation of contact lens designs for orthokeratology that provide better repeatability and predictability of results because the corneal topographer provides an increasingly accurate map of the surface curvature of the cornea.

Further improvements in orthokeratology occurred in recent years because rigid gas permeable contact lenses that provide a much higher oxygen permeability have demonstrated the possibility of wearing the orthokeratology lenses overnight rather than utilizing the contact lenses during the day. Further, the introduction of computer numerically controlled precision lathes and other manufacturing equipment have allowed lens designs for orthokeratology to be manufactured to higher accuracy than previously possible.

Orthokeratology has also been credited by some researchers with slowing or reducing progression of myopia in children. Results of research on this area have been mixed and the effectiveness of orthokeratology in limiting or slowing the progression of myopia is uncertain.

Because the cornea provides a large fraction of the eye's focusing power, and because of the high refractive power and steep curvature of the cornea, very small changes in the curvature of the cornea or corneal thickness can result in substantial changes in refractive error. Accordingly, in orthokeratology, specially shaped contact lenses are used to lightly press on or mold the cornea, causing the cornea to gradually change shape to correct refractive error. The corrective effect may last up to approximately 72 hours once the eye is initially adapted to the lenses. Accordingly, in a usual orthokeratology procedure, according to current practice, contact lenses are worn during sleep and removed during the day. The corneal molding effect after the lenses are removed provides a reduction or elimination of refractive error. Typically, the rigid high oxygen permeability contact lenses are worn for six to eight continuous hours during sleep. Sometimes soft contact lenses are worn during the day at least during the adaptation period for correction of residual refractive errors. Some patients experience a return of some refractive error in the evening for which the orthokeratology lenses or soft contact lenses may be worn to correct refractive error under these circumstances.

Improvements in the accuracy of corneal topography analysis has also provided additional information about the shape of the anterior cornea and has made it apparent that the optical center of the cornea does not always coincide with the visual axis or optical axis of the eye.

There is still room for improvement in the area of orthokeratology contact lenses.

SUMMARY OF THE INVENTION

The invention disclosed and claimed in this application addresses a problem apparent in certain orthokeratology circumstances.

Example embodiments of the invention include a high oxygen permeability rigid gas permeable contact lens for orthokeratology that is sized to approximate the limbal diameter and that has a displaced molding zone as compared to the geometric center of the contact lens. According to embodiments of the invention, the displaced molding zone orthokeratology lens may include a curved shell having a concave surface and a convex surface. The concave surface includes at least a carrier zone and a molding zone. The molding zone is on the concave surface of the shell and has a first curvature and the carrier zone has at least one second curvature, possibly one or several additional curvatures.

According to an embodiment of the invention, the curved shell has a geometrical center centered on the perimeter of the circular lens and the molding zone has a molding zone center that is displaced from the geometrical center. As discussed above, the curved shell may have an overall diameter that approximates the corneal limbal diameter of the eye to which the contact lens is to be applied.

According to embodiments of the invention, the curved shell is structured to be stabilized in rotation relative to the eye to when the lens is worn on the eye during sleep.

DETAILED DESCRIPTION

Figure 1:
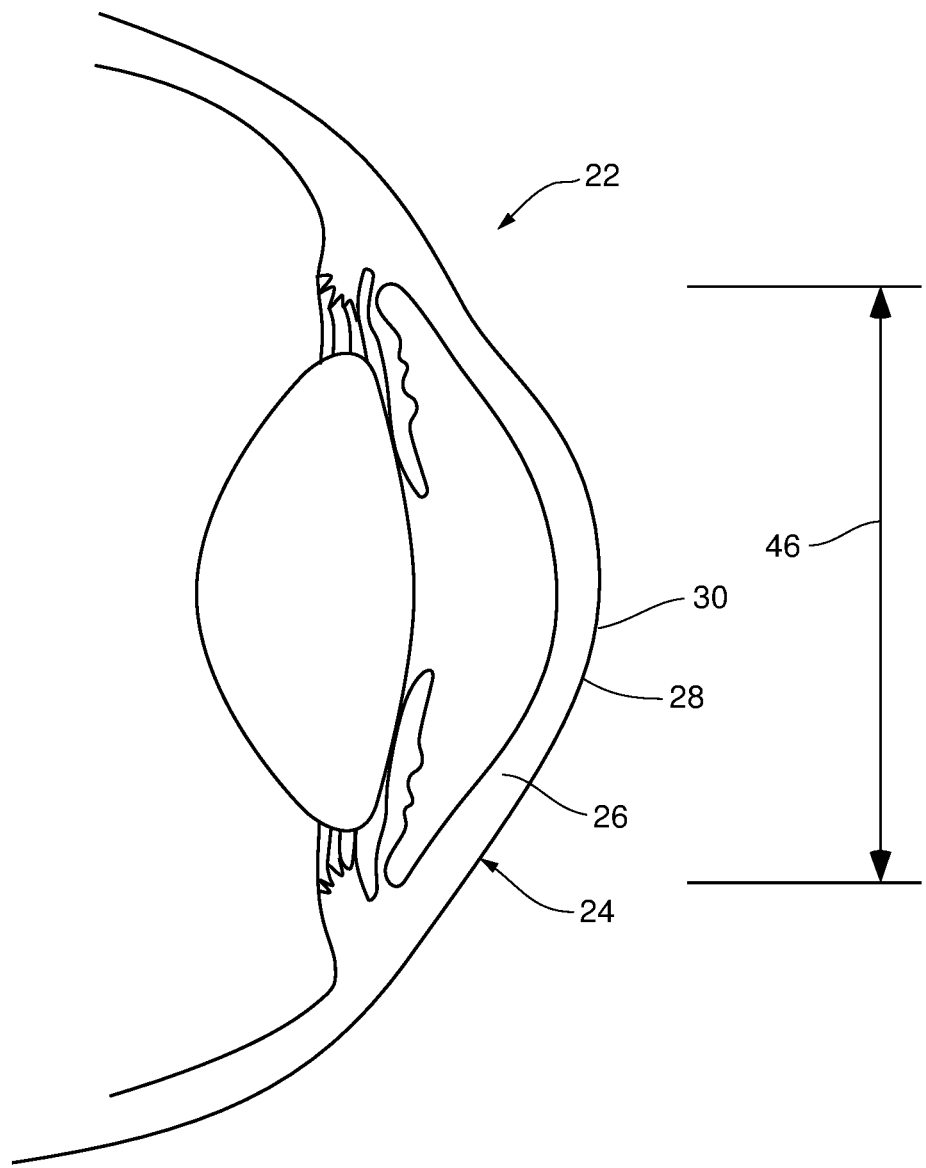
FIG. 1 is a cross-sectional view of the anterior segment of a human eye.
Figure 2:
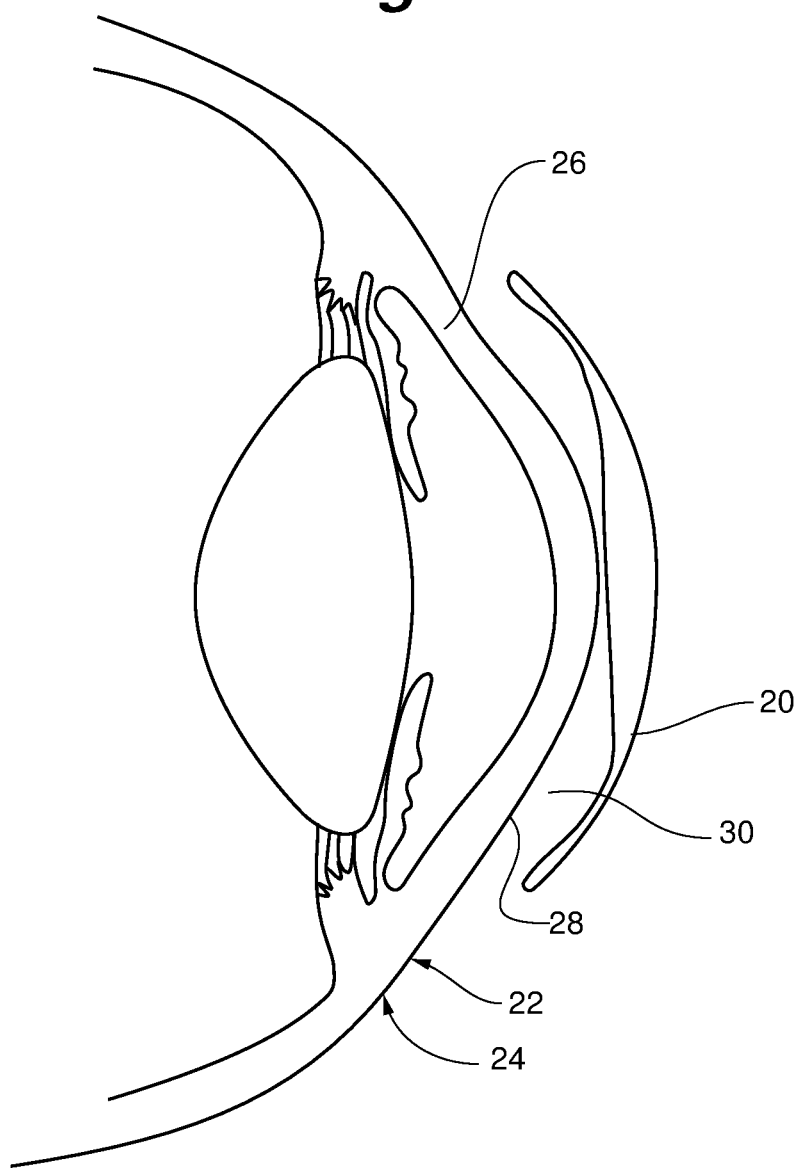
FIG. 2 is a cross-sectional view of the anterior segment of the human eye with a schematically depicted orthokeratology lens in place.
Figure 3:
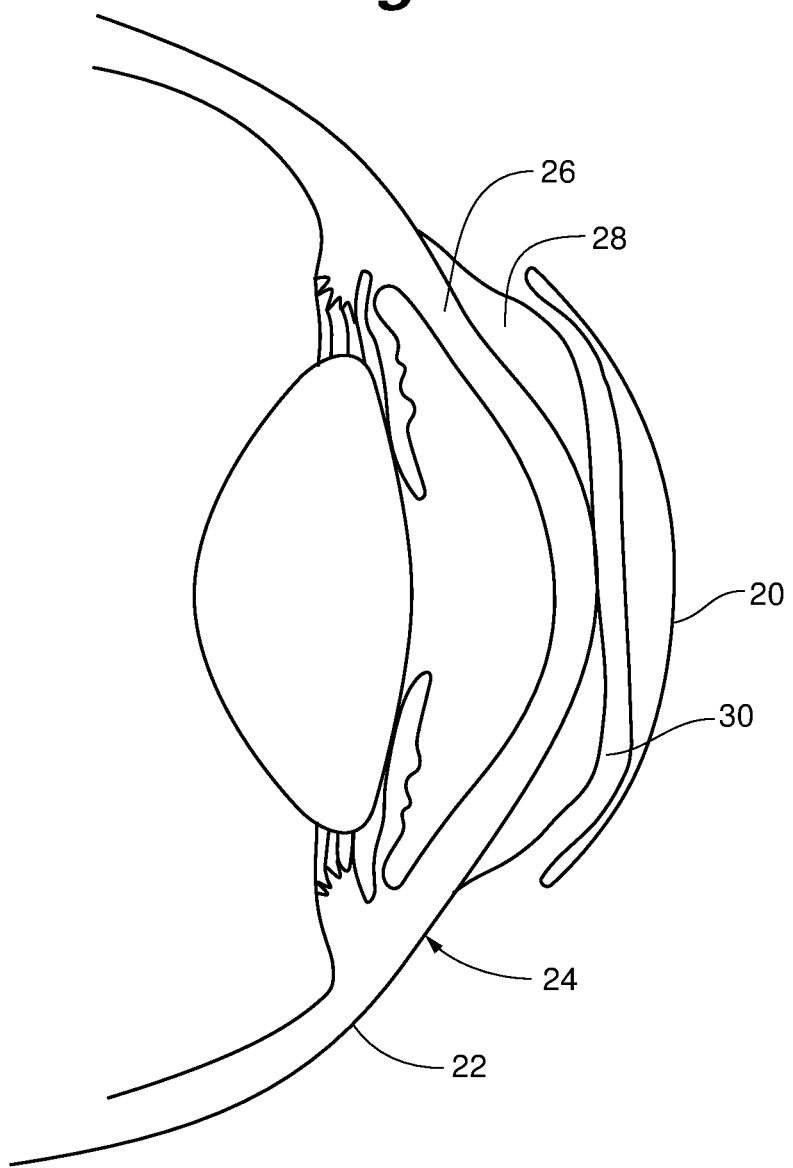
FIG. 3 is a cross-sectional view of the anterior segment of the human eye schematically depicting the effect of an orthokeratology lens on the shape and structure of the human cornea with corneal changes exaggerated for clarity.

Referring to FIGS. 1-3, orthokeratology lens 20 is schematically depicted along with eye 22. Eye 22 includes an anterior segment 24 which further includes cornea 26. Cornea 26 has multiple layers and a structure familiar to those skilled in the art. The eye's structure includes corneal epithelium 28. According to recent theories of the mechanism of action of orthokeratology, orthokeratology lens 20 provides a positive pressure on the tear film 30, centrally and a neutral or negative pressure peripherally. In the context of orthokeratology correction for myopia, this causes compression of central corneal epithelium 28 and reorganization of corneal epithelial cells such that the corneal epithelial cells are displaced more peripherally and less centrally, thus subtly reshaping the anterior corneal epithelium 28 surface resulting in a change in refractive error. In the context of hyperopia orthokeratology correction, pressure is applied to the corneal epithelium more peripherally and less centrally thus causing migration or remodeling of corneal epithelial cells to create a steepening rather than a flattening of the anterior cornea. Known orthokeratology lens designs include a molding or shaping zone that is located centered in the rigid oxygen permeable contact lens.

Figure 4:
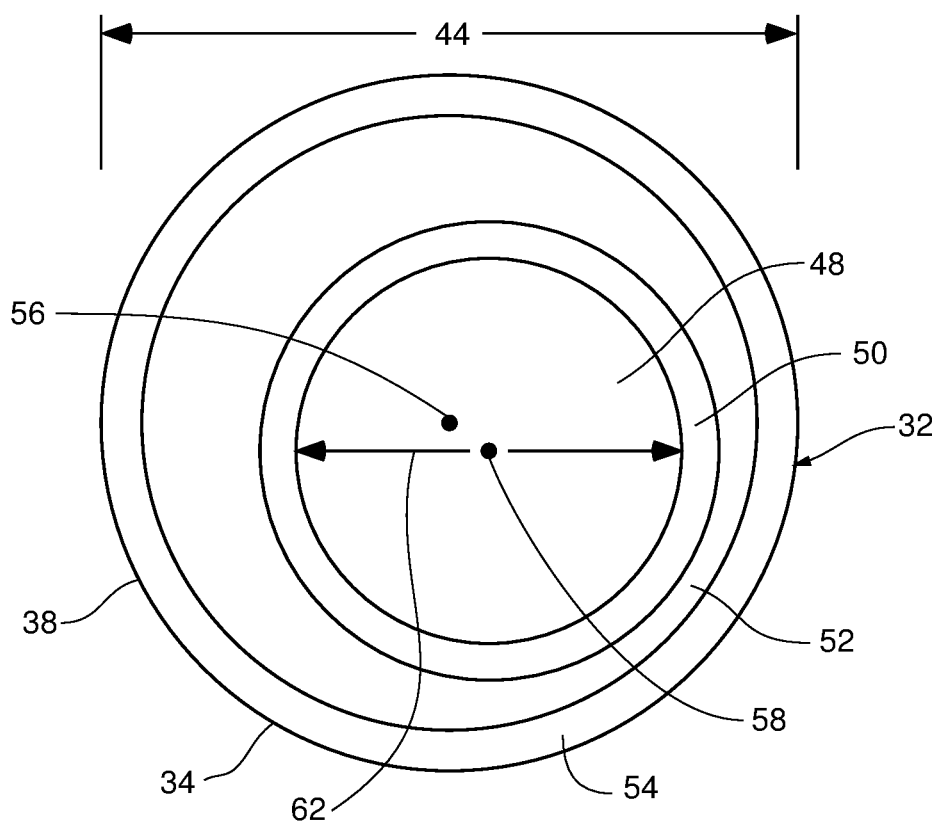
FIG. 4 is an anterior to posterior view of an orthokeratology lens according to an embodiment of the invention including a displaced molding or shaping zone.
Figure 7:
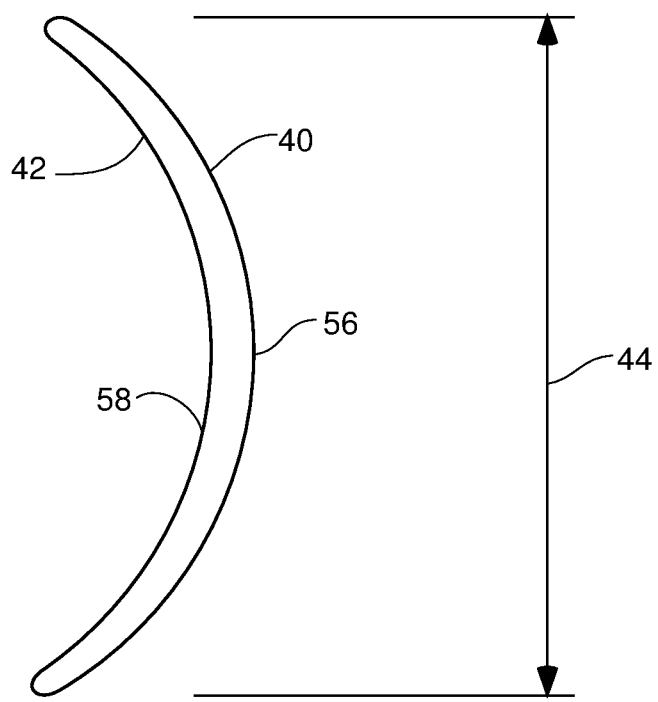
FIG. 7 is a cross sectional view of an orthokeratology lens according to an embodiment of the invention.

Referring now to FIGS. 4 and 7, displaced molding zone contact lens 32 according to an example embodiment of the invention is depicted. Displaced molding zone contact lens 32 is a generally unitary structure formed as a rigid curved shell 34 forming a lens body. Rigid curved shell 34 is formed, for example, from a high oxygen permeability gas permeable rigid contact lens material. According to an example embodiment of the invention, rigid curved shell 34 is intended for overnight wear and accordingly, is formed of an oxygen permeable material having an ISO/Fatt Dk of 85 or more. Rigid curved shell 34 is generally formed of a material approved for overnight wear by the U.S. Food and Drug Association. For example, rigid shell 34 may be formed of a siloxane-fluorocarbon polymer. Lens materials may also include other fluorocarbon polymers and any rigid oxygen permeable contact lens material now available and materials to become available in the future.

Rigid curved shell 34 is defined by peripheral edge 38, anterior convex surface 40 and posterior concave surface 42. Peripheral edge 38 defines overall diameter 44 of displaced molding zone contact lens 32. According to an example embodiment of the invention, overall diameter 44 approximates the limbal diameter 46 of cornea 26. Accordingly, overall diameter 44, according to an example embodiment, is approximately 11.5 mm but may range from approximately 10.5 mm to approximately 12.5 mm. These diameter values are examples and should not be considered limiting unless recited in the claims. Human cornea 26 is generally understood to have a horizontal diameter in a range of 10.76 mm to 12.60 mm and a vertical diameter in a range of about 10.6 mm to about 11.7 mm. Corneal diameter is commonly measured based on the so-called horizontal visible iris diameter (HVID) which is the measured width of the transparent cornea horizontally across the cornea from the white edge of the sclera temporally to the white edge of the sclera nasally. According to example embodiments of the invention, overall diameter 44 may range between approximately 10.5 mm and 13 mm.

Displaced molding zone of contact lens 32, according to an example embodiment of the invention, may be manufactured in a reverse geometry design. Reverse geometry designs include lenses of three zone and four zone designs. These terms are understood by those skilled in the orthokeratology arts.

According to an example embodiment of the invention, referring to FIGS. 4 and 7, rigid curved shell 34 of displaced molding zone contact lens 32 presents concave surface 42 back shaping zone 48, second curve 50, optional third curve 52 and fourth or peripheral curve 54. Rigid curved shell 34 presents geometric center 56. As can be seen in the depicted embodiment, shaping zone center 58 is displaced from geometric center 56 as is second curve 50.

Base curve 60 of back shaping zone 48 is generally formed to be 0.30 to 1.40 mm flatter than the flattest corneal curvature, also known as the flattest K. Back optic zone diameter 62 of back shaping zone 48 can be of any diameter but generally will fall within the range of 6.0 to 8.0 mm.

Second curve 50 also sometimes referred to as a reverse curve, generally has a width of 0.5 to 1.0 mm and is curved to be 0.5 to 1.0 mm steeper than base curve 60. This is the equivalent of approximately 3 to 5 diopters steeper than base curve 60. Optional third curve 52, if present, is also sometimes referred to as an alignment zone. Third curve 52, if present, according to an example embodiment of the invention is 1.0 to 1.5 mm wide.

Fourth or peripheral curve 54 is generally flatter than third curve 52 if present and flatter than second curve 50 in a three zone design. Fourth or peripheral curve 54 is generally structured to provide adequate edge lift and to aid in lens comfort, movement, tear and debris exchange.

In the embodiment depicted in FIG. 4, back shaping zone 48 and second curve 50 are both displaced as compared to geometric center 56. According to another embodiment of the invention, back shaping zone 48 is displaced relative to geometric center 56 while second curve 50 shares its center with geometric center 56.

Figure 5:
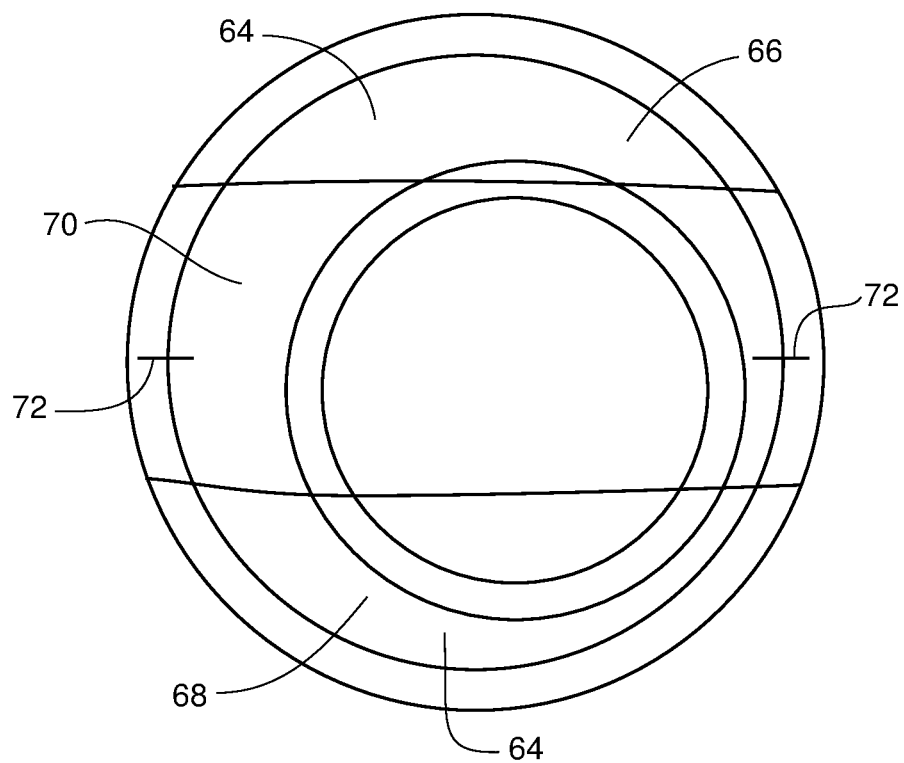
FIG. 5 is an anterior to posterior view of an orthokeratology lens according to an embodiment of the invention including orientation features of the lens.

Referring now particularly to FIG. 5, another embodiment of displaced molding zone contact lens 32 is depicted. Structures similar to those described above with relation to FIG. 4 are marked with similar reference numerals. In the depicted embodiment, stabilizing structures 64 include superior thin zone 66 and inferior thin zone 68. Superior thin zone 66 and inferior thin zone 68 are thinner than center zone 70. According to the depicted embodiment of the lens, orientation marker 72 is also present. Orientation marker 72 may be located inferiorly, nasally or temporally or superiorly so long as it marks a known orientation of displaced molding zone contact lens 32.

Figure 6:
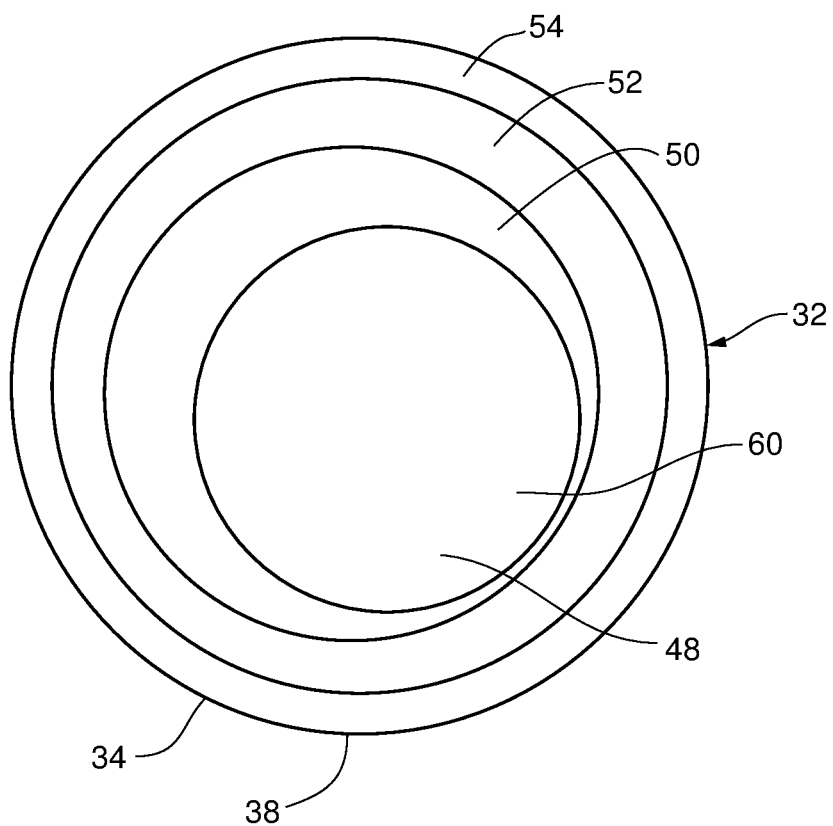
FIG. 6 is anterior to posterior view of an orthokeratology lens according to an embodiment of the invention including a displaced molding or shaping zone.

Referring now to FIG. 6, another embodiment of displaced molding zone contact lens 32 is depicted. In the depicted embodiment, rigid curved shell 34 of displaced molding zone contact lens 32 presents concave surface 42 back shaping zone 48, second curve 50, optional third curve 52 and fourth or peripheral curve 54. Rigid curved shell 34 presents geometric center 56. As can be seen in the depicted embodiment, shaping zone center 58 is displaced from geometric center 56 while second curve 50 is centered on geometric center 56.

Referring now to FIG. 7, a cross sectional view of displaced molding zone contact lens 32 is depicted. In this view, displaced molding zone contact lens 32 presents convex surface 40, concave surface 42, overall diameter 44, geometric center 56 and shaping zone center 58. For clarity, various other zones and curves are not depicted in FIG. 7.

In operation, Displaced molding zone contact lens 32 is placed on cornea 26 of eye 22. Displaced molding zone contact lens 32 is particularly useful for circumstances where the pupil or visual axis of the eye is demonstrated to be displaced from the geometric center of the cornea 26. Displaced molding zone contact lens 32 orients so that back shaping zone 48 is substantially centered on the pupil or visual axis of the eye when the pupil or visual axis is displaced. Accordingly, shaping zone center 58 generally coincides with the visual axis or pupil center of eye 22.

Displaced molding zone contact lens 32 is expected to orient relative the cornea to approximately center back shaping zone 48 on the pupil or visual axis of the eye when the pupil or visual axis is displaced based on alignment between the anterior corneal epithelium 28 and concave surface 42.

Stabilizing structure 64, if present, including superior thin zone 66 and inferior thin zone 68 are met with pressure from eyelids and thus are expected to tend to orient center zone 70 horizontally thus maintaining orientation and location of shaping zone center 58 substantially with the pupillary center or visual axis of eye 22.

If present, orientation marker 72 allows the contact lens wearer or practitioner to determine proper orientation of displaced molding zone contact lens 32 so that shaping zone center 58 substantially coincides with the desired location.

The present invention may be embodied in other specific forms without departing from the spirit of the essential attributes thereof; therefore, the illustrated embodiments should be considered in all respects as illustrative and not restrictive, reference being made to the appended claims rather than to the foregoing description to indicate the scope of the invention.

The invention claimed is:

1. A contact lens for application in practice of orthokeratology on an eye, comprising:
   a curved shell having a concave surface and a convex surface, the concave surface including a carrier zone and a back shaping zone, the back shaping zone having a first spherical curvature and the carrier zone having at least one second spherical curvature;
   the curved shell having a geometric center and the back shaping zone having a shaping zone center;
   the back shaping zone center being offset peripherally from the geometric center;
   the curved shell having an overall diameter that approximates a corneal limbal diameter of the eye to which the contact lens is to be applied;
   wherein the at least one second curvature further comprises a second curve and the second curve is centered on the geometric center and wherein the second curve is located immediately peripheral to the back shaping zone;
   wherein the curved shell defines structures that stabilize rotation of the contact lens relative the eye; and
   wherein the structures that stabilize rotation relative the eye are located on the convex surface of the contact lens.

2. The contact lens as claimed in claim 1, wherein the at least one second curvature further comprises a second curve and the second curve is centered on the molding zone center.

3. The contact lens as claimed in claim 1, wherein the at least one second curvature further comprises a second curve and the second curve is centered on the geometric center.

4. The contact lens as claimed in claim 1, wherein the contact lens is a reverse curve design.

5. The contact lens as claimed in claim 1, wherein the contact lens comprises a three curve design.

6. The contact lens as claimed in claim 1, wherein the contact lens comprises a four curve design.

7. The contact lens as claimed in claim 1, wherein the overall diameter approximates a corneal limbal diameter of the eye to which the contact lens is to be applied.

8. The contact lens as claimed in claim 1, wherein the overall diameter is in a range between 10.5 and 13.0 millimeters.

9. The contact lens as claimed in claim 1, wherein the overall diameter is in a range between 10.5 and 12.5 millimeters.

10. The contact lens as claimed in claim 1, wherein the overall diameter is in a range between 11.0 and 12.0 millimeters.

11. The contact lens as claimed in claim 1, wherein the curved shell defines structures that stabilize rotation of the contact lens relative the eye.

12. The contact lens as claimed in claim 1, wherein the structures that stabilize rotation relative the eye comprise a superior thin zone and an inferior thin zone.

13. The contact lens as claimed in claim 1, wherein the structures that stabilize rotation relative the eye are located on the convex surface of the contact lens.

14. The contact lens as claimed in claim 1, further comprising an orientation marker thereon.

15. A method of manufacturing a contact lens, comprising:
   forming a contact lens having a concave surface including a carrier zone and a back shaping zone, the back shaping zone having a first spherical curvature and the carrier zone having at least one second spherical curvature;
   forming the contact lens to have a geometric center and the back shaping zone to have a shaping zone center, the back shaping zone center being offset peripherally from the geometric center such that the back shaping zone overlies the pupil or the visual axis;
   forming at least one additional curve peripheral to the back shaping zone;
   forming the at least one second curvature such that the at least one second curvature further comprises a second curve and the second curve is centered on the geometric center and forming the second curve such that the second curve is located immediately peripheral to the back shaping zone;
   forming the curved shell such that the curved shell defines structures that stabilize rotation of the contact lens relative the eye; and
   forming the structures that stabilize rotation relative the eye such that the structures that stabilize rotation are located on the convex surface of the contact lens.

16. The method as claimed in claim 15, further comprising forming the contact lens as a reverse curve design.

17. The method as claimed in claim 15, further comprising forming the contact lens as a three curve design.

18. The method as claimed in claim 15, further comprising forming the contact lens as a four curve design.

19. The method as claimed in claim 15, further comprising making the overall diameter approximate a corneal limbal diameter of the eye to which the contact lens is to be applied.

20. The method as claimed in claim 15, further comprising making the overall diameter to be in a range between 10.5 and 13.0 millimeters.

21. The method as claimed in claim 15, further comprising making the overall diameter to be in a range between 11.0 and 12.0 millimeters.

22. The method as claimed in claim 15, further comprising forming structures that stabilize rotation of the contact lens relative the eye.

23. The method as claimed in claim 22, further comprising forming the structures that stabilize rotation relative the eye to comprise a superior thin zone and an inferior thin zone.

* * * * *